United States Patent [19]
Zhidkov et al.

[11] Patent Number: 4,899,994
[45] Date of Patent: Feb. 13, 1990

[54] DEVICE FOR MONITORING THE LEVEL OF MOLTEN METAL IN A CONVERTER

[75] Inventors: Vasily D. Zhidkov; Nikolai A. Kudrin; Vladimir I. Sokolov; Stanislav N. Karelin; Igor A. Bulavintsev; Vladimir N. Churakov, all of Chelyabinsk, U.S.S.R.

[73] Assignee: Vsesojuzny Nauchno-Issledovatelsky Institut Okhrany I Tekhniki Bezpasnosti Chernoi Metallurgii

[21] Appl. No.: 81,714
[22] Filed: Aug. 4, 1987
[51] Int. Cl.[4] ............................................. C21C 5/30
[52] U.S. Cl. ..................................... 266/94; 266/80
[58] Field of Search ........................... 266/80, 92, 94

[56] References Cited
FOREIGN PATENT DOCUMENTS
622849 8/1978 U.S.S.R. .
1154336 5/1985 U.S.S.R. .

OTHER PUBLICATIONS
A. I. Melnik-Shaknazarov et al., "Izmeritelnye pribory so vstroennymi mikroprotsessorami", 12/1985 pp. 10-17.
N. S. Pronkin, "Pervichnye preobrazovateli radioizotopnoy apparatury", 12/1984 p. 69.

Primary Examiner—S. Kastler
Attorney, Agent, or Firm—Ladas & Parry

[57] ABSTRACT

A device for monitoring the level of molten metal in a converter comprises a γ-radiation source, a γ-radiation receiver connected to an input of an amplifier connected to a pulse amplitude analyzer, a timer, a molten metal level data display unit. The device for monitoring the level of molten metal in a converter also comprises a processor, a converter position transducer, an oxygen lance position transducer. The inputs of the processor are connected, respectively, to the pulse amplitude analyzer, to the timer, to the converter position transducer, and to the oxygen lance position transducer. The processor outputs are connected to the molten level data display unit and to the timer respectively.

10 Claims, 4 Drawing Sheets

DEVICE FOR MONITORING THE LEVEL OF MOLTEN METAL IN A CONVERTER

FIELD OF THE INVENTION

The present invention relates to systems for monitoring steel-making processes and, more particularly, the invention relates to a device for monitoring the level of molten metal in a converter.

The invention can be used in metallurgy.

PRIOR ART

Known in the art is a device for measuring the level of molten metal in a converter (SU, A, 622,849) comprising a sound pressure transducer, a sound pressure envelope detector connected to the sound pressure transducer, a functional sound pressure converter having a first input connected to the output of said sound pressure envelope detector, and an adder resetting the sound pressure with the oxygen lance position and having a first input connected to the output of the functional sound pressure transformer. Furthermore, the device for measuring the molten metal level in a converter includes a sound pressure adapter unit whose first input is connected to the output of the sound pressure envelope detector while the second input is connected to the adder output; the first output of said unit is connected to the second input of the functional sound pressure transformer. This device also includes an oxygen lance position transducer whose output is connected to the second input of said adder, and a molten metal level indicator, the first input of which is connected to the adder output and the second input is connected to the second output of the sound pressure adapter unit.

The prior art device features low accuracy of the displayed data on the molten metal level in the converter since the sound pressure depends on permanently and arbitrarily variable geometric size of the converter chamber, on changes in the position of the oxygen lance, on the flow rate of oxygen in the process of blowing, and on the chemical and physical properties of the slag. The device also features poor operational reliability since the receivers of the sound pressure transducer must be cleaned.

Known in the art is a device for monitoring the molten metal level in a converter having an oxygen lance (SU, A, 1,115,336) comprising a γ-radiation source and a γ-radiation receiver mounted on the converter gas cooling vessel above the converter nose, an amplifier whose input is connected to the γ-radiation receiver, a pulse amplitude analyzer connected to the amplifier output, a γ-radiation intensity meter connected to the output of said pulse amplitude analyzer. This device also comprises a variable frequency generator connected to the first input of said γ-radiation intensity meter, a timer whose first input is connected to the variable frequency signal generator, and a pulse coincidence circuit. The first input of said pulse coincidence circuit is connected to the output of the pulse amplitude analyzer, the second input of said circuit is connected to the first output of the timer. In addition, this device comprises a unit to display data on the molten metal level, a level counter whose first input is connected to the output of the pulse coincidence circuit, a memory register whose first input is connected to the output of the level counter, and a control unit. The input of said control unit is connected to the second output of said timer. The first output of the control unit is connected to the second input of the timer, the second output is connected to the second input of the level counter, the third output is connected to the second input of the memory register. The first input of the molten metal level data display unit is connected to the second output of the γ-radiation intensity meter, while the second input is connected to the output of the memory register.

The known device has insufficient accuracy of display of the data on the molten metal level due to the fact that in the process of operation particles of metal and slag stick to the edges of the openings made in the cooling boiler for passing the direct flow of γ-radiation and reception of the scattered γ-radiation.

The intensity of γ-radiation reflected from the molten metal surface is determined by the expression $$I = I_o + N_o \cdot 3{,}7 \cdot 10^{10} \cdot a_m \cdot n \cdot \frac{\Omega}{4\pi} \cdot \epsilon \cdot \frac{S}{R^2}, \frac{(\gamma\text{-quanta})}{S}, \quad (1)$$

wherein I is the flow intensity of the γ-radiation received by the γ-radiation receiver (γ-quanta)/C $I_c$ is the constant component of the intensity of the γ-radiation flow (γ-quanta/S)

$N_o$ is the γ-radiation source activity, a , n is the yield of γ-quanta per nucleus decay, for radionuclide 137Cs, n=0.82;

$\Omega$ is the solid angle of a directed flow of γ-radiation, sr;

$a_m$ is the reflection factor of γ-radiation (albedo), $a_m$=0.2;

$\epsilon$ is the γ-radiation receiver efficiency;

S is the effective area of the γ-radiation receiver, m²;

R is the distance from the reflective surface to the γ-radiation source, m.

From the expression (1) it follows that when particles of metal and slag stick to the edges of the openings, the effective area S of the γ-radiation receiver is reduced. This means that at the same levels of the molten metal in the converter the γ-radiation value recorded by the γ-radiation receiver varies from heat to heat, in which case the dynamic range of change of the output signal of the pulse amplitude analyzer also varies. In order that the readings displayed by the molten metal level data display unit correspond to the true position of the molten metal level in the converter, i.e. the dynamic range of change of the input signal at the molten level data display unit corresponds to the range of variation of the molten metal level in the converter, periodic manual adjustment of the upper and lower limits of the level range indicated by the molten metal level data display unit is required. Taking into account that the intensity of the flow of γ-radiation reflected from the molten metal surface is a function of the square distance between the reflecting surface and the γ-radiation source (cf. Expression (1) and also the fact that the molten metal level data display unit must receive a signal which is a linear function of the molten metal level, in the prior art device the signal is linearized by mechanical means (compensation cam). Thus, a change in the dynamic range of the output signal of the pulse amplitude analyzer results in poor linearization of the signal in this device and this also reduces the accuracy of the displayed data on the molten metal level. Furthermore, the electromechanical character of the molten metal level data display unit results in its frequent malfunctions and in a significant delay in displaying the data on the molten metal level change so that the above device for monitoring the molten metal level in the converter has insufficient operational reliability and low accuracy of information transfer.

The object of the invention is to provide a device for monitoring the molten metal level in a converter presenting more accurate information on the molten metal level in the converter and having high operational reliability.

This object is attained by providing a device for monitoring the molten metal level in a converter with an oxygen lance comprising a γ-radiation source and a γ-radiation receiver located above the converter nose, an amplifier whose input is connected to the γ-radiation receiver, a pulse amplitude analyzer connected to the amplifier output, a timer, and a molten level data display unit; according to the invention, the device includes a processor, the first input of which is connected to the output of the pulse amplitude analyzer, the second input is connected to the output of the timer; the first output of the processor is connected to the input of the molten metal level data display unit, while the second output thereof is connected to the input of the timer; a converter position transducer connected to the third input of the processor, and an oxygen lance position transducer connected to the first input of the processor.

The presence of a processor, a converter position transducer and a lance position transducer in the device for monitoring the molten metal level in a converter makes it possible to effect automatic correction of the linearization factors of the output signal of the pulse amplitude analyzer according to the dynamic range of this signal for each heat thus increasing the accuracy of displaying the data on the molten metal level in the converter and increasing the reliability of the device in the process of operation.

The claimed device for monitoring the molten metal level in a converter makes it possible to increase the accuracy of the displayed data on the molten metal level. In addition, the device features high operational reliability. The claimed device for monitoring the molten metal level in a converter also makes it possible to optimize the process of heat blowing, to eliminate metal blow-out, to reduce the loss of metal and consumption of slag-forming materials, and to eliminate possible injury of the converter operators by molten metal and slag in the process of blowing a heat.

The invention is further described by way of example with reference to the accompanying drawings.

Figure 1:
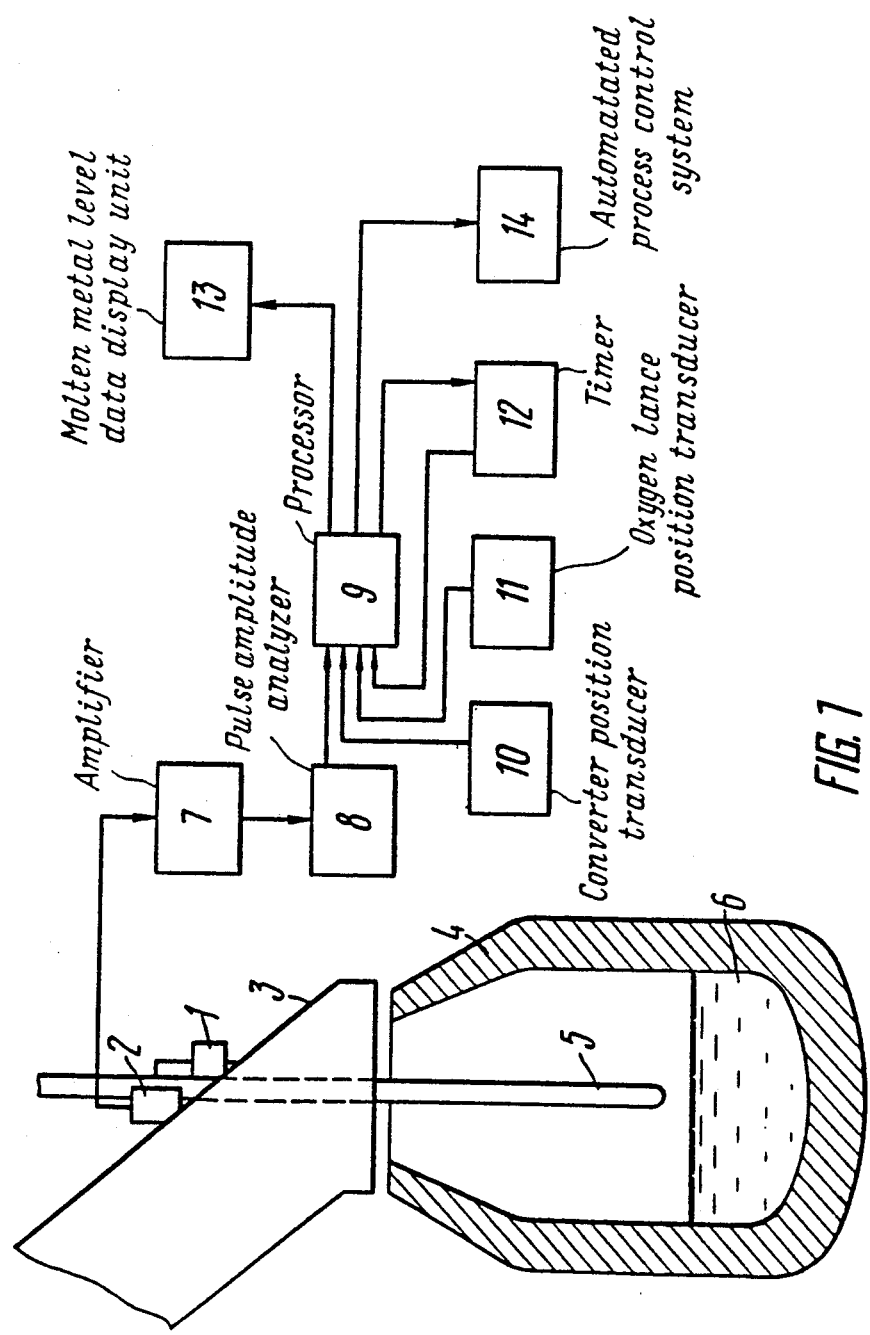
FIG. 1 is a block diagram of the device for monitoring the molten metal level in a converter, according to the invention.

The device for monitoring the molten metal level in a converter comprises a γ-radiation source 1 and a γ-radiation receiver 2 arranged on a boiler 3 of a cooler of converter gases above the nose of a converter 4 with a lance 5 for blowing oxygen into a molten metal 6. The device for monitoring the molten metal level in a converter also comprises an amplifier 7 whose input is connected to the γ-radiation receiver 2, and a pulse amplitude analyzer 8 whose input is connected to the output of the amplifier 7. The γ-radiation receiver 2 may be built around a well known circuit (N.S. Pronkin, "Pervichnye preobrazovateli radioizotopnoy apparatury", 1984, Energoatomizdat, Moscow, p. 69). The amplifier 7 may be based on a well known circuit (N.S. Pronkin, "Pervichnye preobrazovateli radioizotopnoy apparatury", 1984, Energoatomizdat, Moscow, p. 68). The pulse amplitude analyzer 8 may be based on a well known circuit, i.e. it may consist of a discriminator and a matching stage in a prior art device (N.S. Pronkin, "Pervichnye preobrazovateli radioizotopnoy apparatury", 1984, Energoatomizdat, Moscow, p. 68).

The device for monitoring the molten metal level in a converter also comprises a processor 9 whose first input is connected to the output of the pulse amplitude analyzer 8, a converter position transducer 10, an oxygen lance position transducer 11, and a timer 12. The second input of the processor 9 is connected to the timer 12, the third input of the processor 9 is connected to the converter position transducer 10, while the fourth input thereof is connected to the oxygen lance position transducer 11. The processor 9 may be based on a well known circuit (A. I. Melnik-Shaknazarov et al. "Izmeritelnye pribory so vstroennymi mikroprotsessorami", 1985, Energoizdat (Moscow), p. 10–17, particularly p. 16).

The device for monitoring the molten metal level in a converter also comprises a molten metal level data display unit 13 connected to the first output of the processor 9. The second output of the processor 9 is connected to the input of the timer 12. The third output of the processor 9 is connected to an automatic process control system 14.

Figure 2:
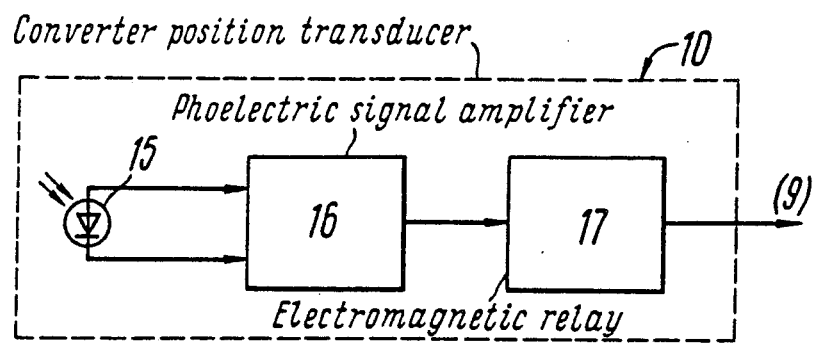
FIG. 2 is a block diagram of the converter position transducer, according to the invention.

The block diagram of the converter position transducer 10 is shown in FIG. 2. The converter position transducer 10 comprises photocell 15 connected to a photoelectric signal amplifier 16 and an electromagnetic relay 17 whose input is connected to the output of the photoelectric signal amplifier 16. The normally open contacts (not shown) of the electromagnetic relay 17 are connected to the third input of the processor 9 (FIG. 1).

Figure 3:
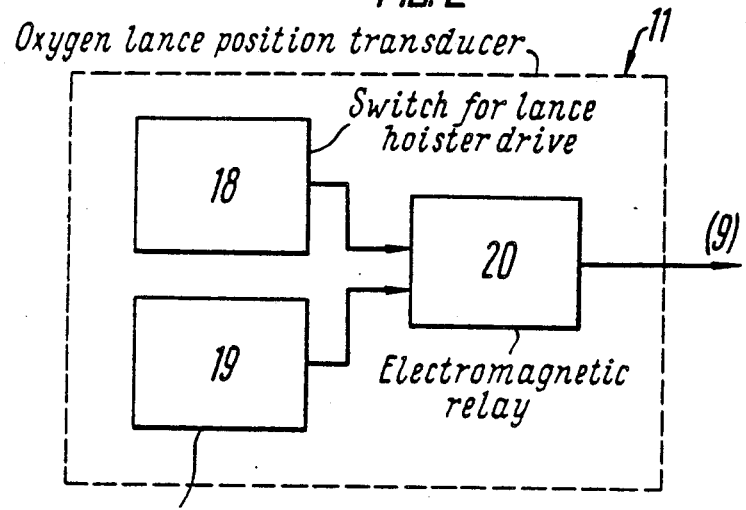
FIG. 3 is a block diagram of the oxygen lance position transducer, according to the invention.

The block diagram of the oxygen lance position transducer 11 is given in FIG. 3. The oxygen lance position transducer 11 includes a switch 18 of a mechanism for lifting and lowering the oxygen lance 5, a switch 19 of a mechanism for supply of oxygen into the oxygen lance 5 and an electromagnetic relay 20 whose inputs are connected to the outputs of the switches 18, 19. The drive of the mechanism for lowering and raising the lance 5 and the drive of the mechanism for supply of oxygen into the lance 5 are not shown in the drawings. The normally open contacts (not shown) of the electromagnetic relay 20 are connected to the fourth input of the processor 9 (FIG. 1).

Figure 4:
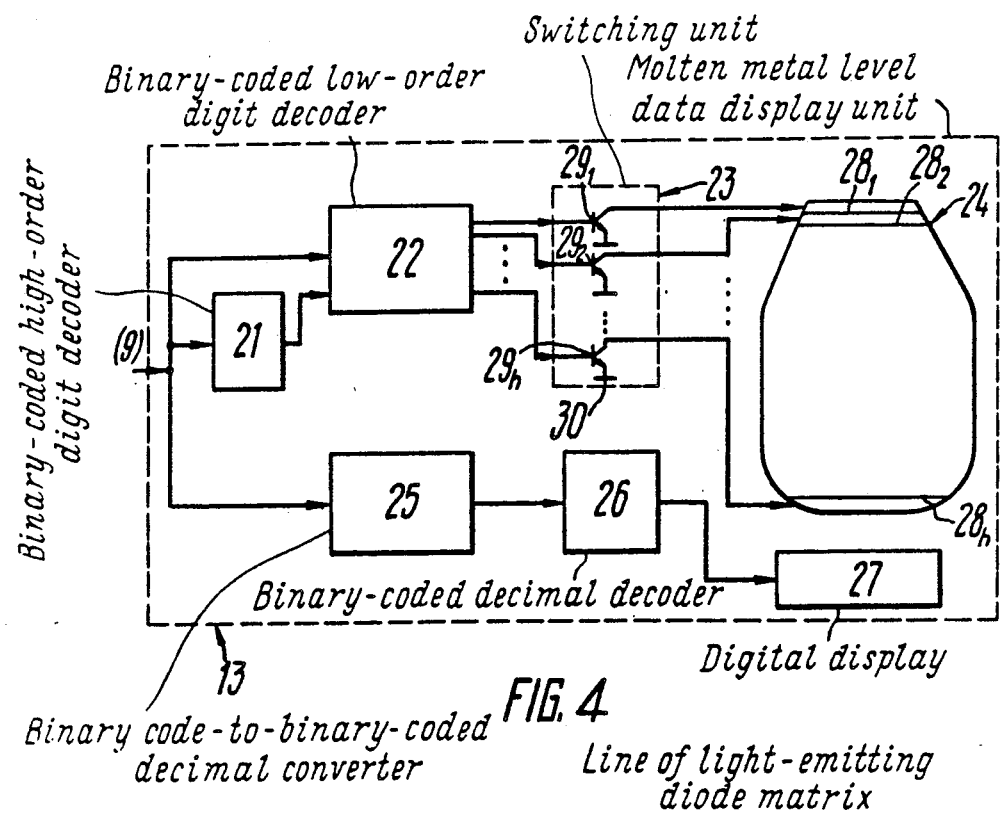
FIG. 4 is a block diagram of the data display unit, according to the invention.

The molten metal level data display unit 13 may be set up according to a block diagram shown in FIG. 4. The molten metal level data display unit 13 comprises a decoder 21 for decoding the high-order digits of a binary code and a decoder 22 for decoding the lower-order digits of the binary code. The input of the decoder 21 and the first input of the decoder 22 are connected to the first output of the processor 9. The output of the decoder 21 for decoding the high-order digits of the binary code is connected to the second input of the decoder 22 for decoding the low-order digits of the binary code. The molten metal level data display unit 13 also comprises a unit 23 of switches whose inputs are connected to the outputs of the decoder 22 for decoding the low-order digits of a binary code, while the outputs of the unit 23 of the switches are connected to a light emitting diode matrix 24. The molten metal level data display unit 13 also includes the following elements connected in series: a binary-to-binary-coded decimal (BCD) converter, a decoder 26 for decoding a BCD code into a code of seven-segment digital indicators, and a digital display 27 consisting of three seven-segment light emitting diode indicators (not shown). The input of the converter 26 is connected to the first output of the processor 9.

The light-emitting diode matrix 24 has h lines $28_1$, $28_2$ to $28_h$, h being equal, for example, to 64. The switching unit 23 includes h transistors $29_1$, $29_2$ to $29_h$, each transistor controlling a respective line $28_1$, $28_2$ to $28_h$ of the light-emitting diode matrix 24. The base of each transistor $29_1$, $29_2$ to $29_h$ is connected to the corresponding output of the decoder 22 of lower-order binary digit while the emitters are connected to each other and to a common bus 30. The collector of each of the transistors $29_1$, $29_2$ to $29_h$ is connected to the corresponding line $28_1$, $28_2$ to $28_h$.

Figure 5:
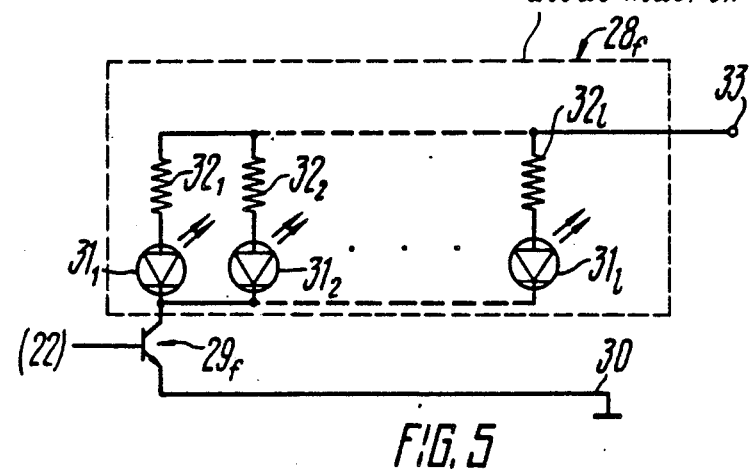
FIG. 5 is a schematic diagram of the line of the light emitting diode matrix with a corresponding transistor of the switching unit, according to the invention.

FIG. 5 shows a schematic diagram of the fth line $28_f$ of the light-emitting diode matrix 24 comprising a specified amount 1 of light-emitting diodes $31_1$, $31_2$ to $31_h$ (FIG. 5) with a respective silicon transistor $29_f$ of n-p-n conductivity type of the switching unit 23 (FIG. 4). The red-glow light-emitting diodes $31_1$, $31_2$ to $31_h$ (FIG. 5) are set up in the light-emitting diode matrix 24 (FIG. 4) in the form of a profile of the converter 4 (FIG. 1). The profile of the converter 4 defines a preset amount 1 of light-emitting diodes $31_1$, $31_2$ to $31_1$ (FIG. 5) in each line $28_1$, $28_2$ to $28_h$ (FIG. 4). The preset amount 1 is selected from six to ten. Each line $28_1$, $28_2$ to $28_h$ of the light-emitting diode matrix 24 also comprises a preset amount 1 of current limiting resistors $32_1$, $32_2$ to $32_1$ (FIG. 5). The first terminal of each resistor $32_1$, $32_2$ to $32_1$ is connected to the anode of the appropriate light-emitting diode $31_1$, $31_2$ to $31_1$. The second terminals of the resistors $32_1$, $32_2$ to $32_1$ are interconnected and connected to a bus 33 of a power supply source. The power supply source is not shown in the drawing. The cathodes of the light-emitting diodes $31_1$, $31_2$ to $31_1$ are connected to each other and to the collector of the transistor $29_f$ whose emitter is connected to the common bus 30, while the base is connected to the output of the decoder 22 of low-order digits of the binary code.

Figure 6:
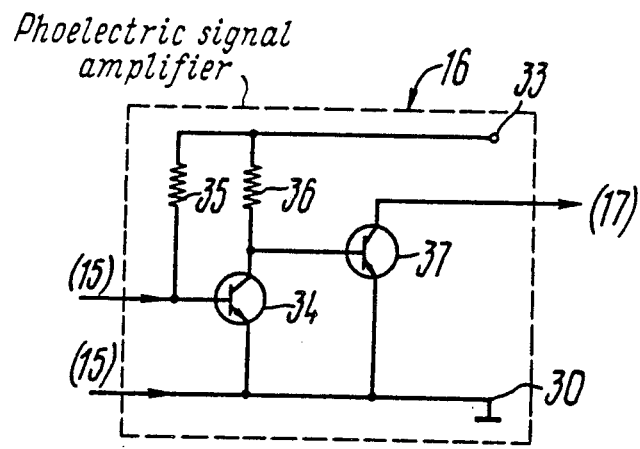
FIG. 6 is a schematic diagram of the photoelectric signal amplifier, according to the invention.

The photoelectric signal amplifier 16 (FIG. 2) is based on a schematic diagram shown in FIG. 6. The photoelectric signal amplifier 16 comprises a transistor 34 whose base is connected to the anode of the photosensitive cell 15 and to the first terminal of the resistor 35 providing a bias current in the base junction of the transistor 34. The second terminal of the resistor 35 is connected to the bus 33 of the power supply source. The power supply source is not shown in the drawing. The collector of the transistor 34 is connected to the first terminal of the resistor 36 and to the base of a transistor 37. The emitters of the transistors 34 and 37 and the cathode of the photosensitive cell 15 (FIG. 2) are connected to each other and to the common bus 30 (FIG. 6). The collector of the transistor 37 is connected to the input of the electromagnetic relay 17. (FIG. 2).

Figure 7:
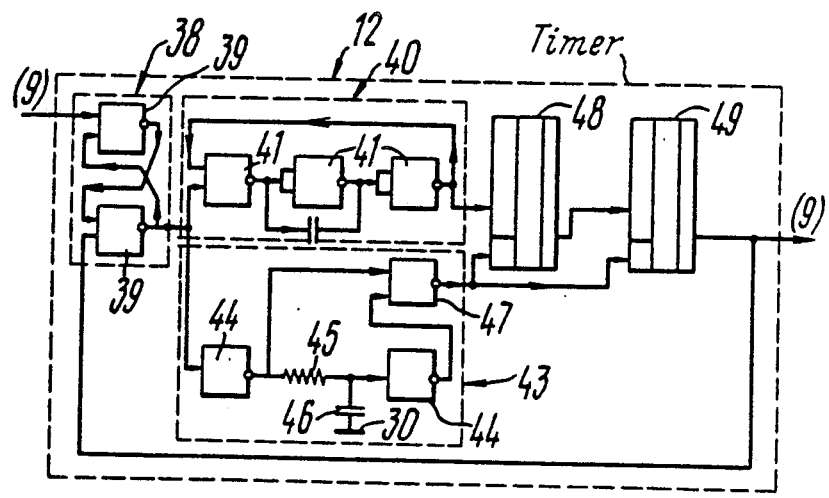
FIG. 7 is a schematic diagram of the timer, according to the invention.

The timer 12 (FIG. 1) may be based on a schematic diagram shown in FIG. 7. The timer 12 comprises a trigger 38 built around two 2NAND circuits, a clock pulse generator 40 based on three 2NAND circuits 41 connected in series, a capacitor 42, and a reset pulse shaper 43. The first input of the first logical circuit 39 is an input of the trigger 38, the output of the first logical circuit 39 is connected to the first input of a second logical circuit 39, while the output of the second logical circuit 39, which is an output of the trigger 38, is connected to the second input of the first logical circuit 39, to the input of the clock pulse generator 40 and to the input of the reset pulse shaper 43. The output of a third 2NAND circuit 41 is an output of the clock pulse generator 40 and is connected to the first input of the first 2NAND circuit 41; the second input of the first 2NAND circuit 41 is an input of the clock pulse generator 40. The first terminal of a capacitor 42 is connected to the output of the first 2NAND circuit 41, the second terminal of the capacitor 42 is connected to the output of the second 2NAND circuit 41. The reset pulse shaper 43 is based on two NOT circuit 44, a resistor 45, a capacitor 46 and a 2NAND circuit 47. The input of the first NOT circuit is an input of the reset pulse shaper 43, the output of the first NOT circuit 44 is connected to first input of a 2NAND circuit 47 and to the first terminal of the resistor 45. The input of the second NOT circuit 44 is connected to the second terminal of the resistor 45 and to the first terminal of a capacitor 46, while the output of the second NOT circuit 44 is connected to the second input of the logical circuit 47. The second terminal of the capacitor 46 is connected to the common bus 30. The output of the 2NAND circuit 47 is an output of the reset pulse shaper 43 and is connected to the reset inputs of counters 48 and 49. The input of the counter 48 is connected to the output of the clock pulse generator 40, while the output is connected to the input of the counter 49. The output of the counter 49 is an output of the timer 12 and is connected to the second input of the second 2NAND circuit 39 and to the second input of the processor 9.

From the expression (1) it follows that when particles of molten metal 6 (FIG. 1) stick to the edges of the opening made in the boiler 3 under the γ-radiation receiver 2, the effective area S of the γ-radiation receiver 2 is reduced and the radiation flux received by the γ-radiation receiver 2 is also reduced. When the sectional area of the opening increases, e.g. due to a blast occurring when water penetrates into the converter 4, the γ-radiation flux received by the γ-radiation receiver 2 increases. Wear of the lining of the converter 4 as well as any structural changes in the converter system affect the constant component $I_o$ of the scattered γ-radiation. Since the other values in the expression (1) are constant, while $I_o$ and S remain practically the same during one feat, the expression (1) for the period of blowing an individual heat may be written in the form $$I = a + \frac{b}{(C - H)^2} \qquad (2)$$

wherein H is the level of molten metal in the converter, m;

a and b are the linearization factors constant for the given heat;

C is the distance from the γ-radiation receiver 2 to the converter bottom, m.

By the intensities of the scattered radiation flux at two fixed points with a known molten metal level H corresponding to the level of the still molten metal 6 after pouring in the conversion iron and to the noise level of the converter 4 by solving a system of two equations with two unknown factors in the expression (2). An electric signal proportional to the intensity of γ-radiation scattered by the molten metal is produced by the pulse amplitude analyzer 8. The value of the electric signal is determined by the expression:

$$U = a_1 + \frac{b_1}{(C - H)^2} \quad (3)$$

wherein $a_1$ is the linearization factor proportional to the factor a in the expression (2);

$b_1$ is the linearization factor proportional to the coefficient in the expression (2);

U is the electric signal value, V;

C is the distance from the γ-radiation receiver 2 to the bottom of the converter 4, m;

H is the level of molten metal in the converter 4, m.

The device for monitoring the molten metal level in a converter operates as follows. The γ-radiation flux from the γ-radiation source 1 (FIG. 1) is directed onto the surface of the molten metal 6. The γ-radiation scattered by the surface of the molten metal 6 is received by the γ-radiation receiver 2 mounted on the boiler 3 of the cooler of converter gases above the nose of the converter 4. The pulses of the scattered γ-radiation from the γ-radiation receiver 2 are amplified by the amplifier 7 and are fed to the pulse amplitude analyzer 8, where the γ-radiation scattered by the surface of the molten metal 6 are separated from possible noise pulses. If particles of the molten metal 6 stick to the edges of the opening made in the boiler 3 for passing the scattered γ-radiation to the γ-radiation receiver 2, the effective area S of the γ-radiation receiver 2 is decreased and this reduces the γ-radiation flux received by this receiver. In case of exfoliation of the stuck particles of molten metal 6 from the edges of the opening the effective area S of the γ-radiation receiver 2 increases as well as the γ-radiation flux received by the receiver 2. In both cases the linearization factors $a_1$ and $b_1$ in the expression (3) must be corrected to provide direct proportionality of the output signal of the pulse amplitude analyzer 8 to the level of the molten metal 6. For this purpose, the device for monitoring the molten metal level in the a converter 4 is provided with a processor 9, a converter position transducer 10 and an oxygen lance position transducer 11. Using these components, in the process of each heat, it is possible to automatically correct the factors $a_1$ and $b_1$ for linearization of the output signal of the pulse amplitude analyzer 8 in response to the change of the dynamic range of this signal, and this increases the accuracy of displaying the data on the level of molten metal 6 in the converter 4 and increases the reliability of the device in the process of operation. The correction of the factors $a_1$ and $b_1$ of linearization of the output signal of the pulse amplitude analyzer 8 corresponding to the variation of the dynamic range of this signal is effected as follows. The processor 9 is in a standby mode waiting a signal from the converter position transducer 10. The photosensitive cell 15 (FIG. 2) is set in such a way that only when the converter 4 (FIG. 1) is put in a horizontal position, i.e. a position of overflow of steel, the cell 15 is illuminated by the light emitted by the molten metal, and a signal from the photosensitive cell 15 is fed to the photoelectric signal amplifier 16 and, having been amplified, this signal results in operation of the electromagnetic relay 17.

The photoelectric signal amplifier 16 (FIG. 6) operates as follows. A voltage is applied to the bus 33 of the power source. In the initial condition the resistance of the photosensitive cell 15 is high, therefore, the base current of the transistor 34 depends solely on the resistance of the resistor 35, the transistor 34 is rendered conductive and bridges the base-emitter junction of the transistor 37. The transistor 37 is rendered nonconductive. No current flows through the winding of the electromagnetic relay 17 (FIG. 2) and the contacts of the electromagnetic relay 17 connected to the third input of the processor 9 (FIG. 1) are open. When the photosensitive cell 15 (FIG. 2) is illuminated, its resistance drastically drops bypassing the base-emitter junction of the transistor 34 (FIG. 6) so that the transistor 34 is rendered nonconductive and its collector current drops. As a result, the base current of the transistor 37 is determined solely by the resistance of the resistor 36. The resistance of the resistor 36 is selected so that the transistor 37 comes to saturation and its collector current is controlled solely by the resistance of the winding of the electromagnetic relay 17 inserted in the collector circuit of the transistor 37 (FIG. 6). The electromagnetic relay 17 (FIG. 2) operates and closes the normally open contacts connected to the third input of the processor 9 (FIG. 1). The processor 9 interrogating the converter position transducer 10 finds out that the converter 4 is in a position for measuring the upper limit of the measuring range of the level of the molten metal 6. Having received a signal from the transducer 10 of position of the converter 4, the processor sends a signal to the input of the timer 12.

The timer 12 operates as follows. As soon as the signal from the second output of the processor 9 is applied to the first input of the trigger 38 (FIG. 7), the trigger 38 flips and at the output of the second logical circuit 39, which is an output of the trigger 38, there is produced a signal corresponding to logical one starts the clock pulse generator 40. The clock pulse generator 40 is started and stopped by signals applied to the 2NAND circuit 41. The capacitor 42 controls the frequency and duration of the clock pulses. At the same time, when a signal corresponding to logical one appears at the output of the trigger 38, at the output of the 2NAND circuit 47 there is shaped a short pulse, which resets the counters 48 and 49 to their initial zero state. The pulse duration is controlled by the resistance of the resistor 45 and by the capacitance of the capacitor 46. Applied to the input of the counter 48 are output pulses of the clock pulse generator 40. The output pulses of the counter 48 are sent to the input of the counter 49 at a repetition frequency multiple to the scaling factor of the counter 48. After a preset number of pulses have been sent to the input of the counter 49, the latter generates an output signal corresponding to logical one, which is applied to the second input of the second 2NAND circuit 39 and resets it. The same signal is applied to the second input of the processor 9 (FIG. 1). Generated at the output of the trigger 38 (FIG. 7) is a signal corresponding to logical zero, which is applied to the input of the clock pulse generator 40 thus ceasing its operation. The timer 12 is set to a standby state in which it is expecting a signal from the second output of the processor 9 (FIG. 1). The processor 9 starts interrogating the pulse amplitude analyzer 8 and writes in its memory the obtained value of the intensity I of the γ-radiation flux scattered from the nose of the converter 4. This cycle is repeated K times, where K is determined by the duration of the time interval preset by the timer 12. When the preset time interval expires, the output signal of the timer 12 is applied to the second input of the processor 9 and initiates the finding of the average arithmetic value of the intensity I of the γ-radiation flux scattered from the converter nose and corresponding to the upper limit of the level of the molten metal 6. This value is found from the expression:

$$I_{max} = \sum_{i=1}^{k} I_i/K \quad (4)$$

wherein $I_{max}$ is the average intensity of the scattered γ-radiation flux corresponding to the upper level H of the molten metal 6 (at the nose of the converter 4);

$I_i$ is the intensity of the γ-radiation flux scattered from the nose of the converter 4 during ith measurement;

K is the number of interrogations per time interval determined by the timer 12.

The obtained value of $I_{max}$ is stored in the memory of the processor 9. Then the processor 9 is transferred to a standby state for expecting a signal from the transducer 11 sensing the position of the lance 5. When the lance 5 is raised and no oxygen is fed into the lance 5, the switch 18 (FIG. 3) of the lance hoister drive and the switch 19 of the oxygen supply system drive are off, while the contacts of the electromagnetic relay 20 are open. After charging the converter 4 (FIG. 1) with scrap and molten iron, the converter 4 is set in a vertical position. In lowering the lance 5 and feeding oxygen therein, the switch 18 (FIG. 3) of the lance hoister drive and the switch 19 of the oxygen supply system operate. The signals sent simultaneously from the switches 18 and 19 result in operation of the electromagnetic relay 20 and closing of its contacts. The processor 9 interrogating the oxygen lance position transducer 11 (FIG. 1) responds to the signal at the fourth input and sends a signal from the second output to the input of the timer 12. After that the pulse amplitude analyzer 8 operates again. At this instant the level H of molten metal 6 in the converter 4 is in the extreme lower position and the intensity I of the scattered γ-radiation flux is at minimum. In a similar way we can determine the arithmetic mean of the intensity I of scattered γ-radiation flux corresponding to the lower limit of the level H of molten metal 6 using the expression:

$$I_{min} = \frac{\sum_{i=1}^{k} \cdot I_j}{K} \quad (5)$$

wherein $I_{min}$ is the mean intensity of the scattered γ-radiation flux corresponding to the lower limit of the level H of molten metal 6;

$I_j$ is the intensity of the scattered γ-radiation flux from the lower limit of the level H of molten metal 6 during the jth measurement;

K is the number of interrogations per time interval determined by the timer 12.

After $I_{min}$ has been calculated and put into processor storage, the processor 9 calculates the signal linearization factors $a_1$ and $b_1$ by solving a system of equations with two unknown quantities $$\begin{aligned}I_{max}=a_1+b_1/(C-H_{max})^2\\ I_{min}=a_1+b_1/(C-H_{min})^2\end{aligned} \quad (6)$$

wherein $a_1$ and $b_1$ are the linearization factors;

C is the distance from the γ-radiation receiver 2 to the bottom of the converter 4, m;

$H_{max}$ is the upper limit of the molten metal 6 corresponding to the nose level of the converter 4;

$H_{min}$ is the lower level of the molten metal 6 corresponding to the molten metal level after the iron has been charged and before the blowing.

After the factors $a_1$ and $b_1$ have been found, the processor 9 is transferred to its basic operating mode for monitoring the level H of molten metal 6 in the converter 4 during the blowing. Using the output signal of the pulse amplitude analyzer 8, the processor 9 calculates the current value of the level H of molten metal 6 in the converter 4 through the expression $$H = C - \sqrt{\frac{b}{I-a}} \quad (7)$$

wherein H and I are respectively the current value of the level of molten metal 6 and the intensity of the scattered γ-radiation flux.

The calculated value of H is compared with the value of $H_{max}$ and $H_{min}$ for the given heat stored in the memory of the processor 9 and is transmitted to the molten metal level data display unit 13 which shows the current level H of molten metal 6. The current value of the level H of molten metal 6 must be within the dynamic range of change of the molten metal level in the converter 4 calculated by the processor 9 for the given heat and limited by the values of $H_{max}$ and $H_{min}$.

The molten metal level data display unit 13 operates as follows. In the initial state, when the level H of molten metal 6 in the converter 4 corresponds to $H_{min}$, the processor 9 is sending logical zero signal through all five digits of the binary code have been decoded in the decoder 21 (FIG. 4) and the low-order digits of the binary code have been decoded in the decoder 22, control signals are fed to the transistors $29_1$, $29_2$ to $29_{h-1}$ of the switching unit 23, which render the transistors $29_1$, $29_2$ to $29_{h-1}$ nonconductive. The transistor $29_h$ receives a signal rendering this transistor conductive, and the light emitting diodes $31_1$ (FIG. 5), $31_2$ to $31_1$ in the line $28_h$ (FIG. 4) glow up indicating that the molten metal level data display unit 13 is on. When the oxygen blowing is started, control signals from the first output of the processor 9 are fed to one of the transistors $29_1$, $29_2$ to $29_h$ whose ordinal number corresponds to the decimal value of the binary code sent from the first output of the binary code processor 9. This transistor is rendered conductive and the line $28_1$ to $28_h$ corresponding to the conductive state of the transistor $29_1$, $29_2$ to $29_h$, i.e. to the position of the level H of molten metal 6 in the converter 4 at this moment, glows. The switching unit 23 is made so that all lines $28_1$ to $28_h$ of the light emitting diode matrix 24 located below the line indicating the level H of molten metal 6 (FIG. 1) in the converter 4 at the given instant, also glow up. The signal from the processor 9 is also sent to the binary-to-binary-coded decimal converter 25 (FIG. 4). After the binary-coded signal has been converted into a binary-coded deciial signal in the converter 25, this binary-coded decimal signal is fed to the decoder 26, where it is decoded and sent to the indicators of the digital display 27, which displays the level H of molten metal 6 in the converter 4 in metres. The molten metal level data display unit 13 set up as is shown in FIG. 4 provides inertia-free readings and essentially increases the operational reliability of the device for monitoring the molten metal level in a converter. During the whole process of operation the data from the third output of the processor 9 are also fed without additional processing to the automation system 14 for automatically controlling the level H of molten metal 6 in the converter 4. After the process of blowing has been completed and the oxygen lance position transducer 11 sends a control signal to the processor 9, the latter ends monitoring the level H of molten metal 6 and starts operating in a standby mode expecting a signal from the converter position transducer 10. When the converter position transducer 10 sends a signal of the horizontal position of the converter 4, and the working cycle is repeated. When additional blowings are effected, the current level H of molten metal 6 is found using the linearization factors $a_1$ and $b_1$ obtained for the basic blowing time.

Thus, the use of the processor 9, converter position transducer 10 and oxygen lance position transducer 11 in the device for monitoring the molten metal level in a converter makes it possible to effect automatic correction of factors $a_1$ and $b_1$ for linearization of the signal of the pulse amplitude analyzer 8 in response to variation of the dynamic range of change of this signal for each melting, and this increases the accuracy of displaying the data on the level H of molten metal 6 in the converter 4. The use of the processor 9, converter position transducer 10 and oxygen lance position transducer 11 in the device also increases the reliability of operation of this device. Thus this system makes it possible to increase the accuracy of display of the data on the molten metal level in a converter and to increase the operational reliability.

What is claimed is:

1. Apparatus for monitoring the level of molten metal in a converter having a nose with an oxygen lance comprising:
    (a) a γ-radiation source directing a γ-radiation flux onto the surface of said molten metal, said source being disposed above said nose of said converter;
    (b) a γ-radiation receiver means to receive pulses of γ-radiation scattered by the surface of said molten metal, said receiver being disposed above said nose of said converter;
    (c) first sensor means for indicating when said converter is in a substantially horizontal position;
    (d) second sensor means for indicating when an oxygen lance is lowered into said converter whereby the substantially vertical position of said converter is detected;
    (e) means for determining the dynamic range of an output signal of said receiver means between a maximum level and a minimum level of molten metal in said converter and for generating factors $a_{11}$ and $b_{11}$ for linearizing said output signal, said means for determining comprising means coupled to said first and second sensor means and to said receiver means for determining said maximum value by measuring said output signal when said first sensor means indicates that said converter is in said horizontal position and for determining said minimum value by measuring said output signal when said second sensor means indicates that said converter is in said vertical position, and processor means for producing said linearization factors from said maximum and minimum values, whereby said factors are corrected for variations in said output signal for each operation of said converter.

2. Apparatus of claim 1 wherein the linearization factors $a_1$ and $b_1$ are:

$$a_1 = \frac{I\max - (C - H\min)^2 (I\min - I\max)}{(C - H\max)^2 - (C - H\min)^2}$$

$$b_1 = \frac{(C - H\min)^2 (C - H\max)^2 (I\min - I\max)}{(C - H\max)^2 - (C - H\min)^2}$$

where:
    I max is the measure intensity of the radiation at the maximum level of molten metal;
    I min is the measured intensity of the radiation at the minimum level of molten metal;
    c is the known distance from the radiation source to the bottom of the converter;
    H max is the upper limit of molten metal corresponding to the nose level of the converter;
    H min is the lower level of the molten metal after being charged with iron but before the blowing.

3. Apparatus of claim 1 wherein said first sensor means includes a photoelectric cell responsive to the light emitted by the molten metal.

4. Apparatus of claim 3 wherein said second sensor means includes a switch coupled to the hoister drive for the oxygen lance.

5. Apparatus of claim 4 wherein said receiver means further comprises an amplifier designed for amplifying and shaping of signals sent from said γ-radiation receiver; an input and an output of said amplifier; said input of said amplifier connected to said γ-radiation receiver; and a pulse amplitude analyzer intended for shaping pulses with a given amplitude at its output; an input and an output of said pulse amplitude analyzer; said input of said pulse amplitude analyzer connected to said output of said amplifier.

6. Apparatus of claim 5 wherein said means for determining further comprises a timer for generating a predetermined number of time intervals of predetermined time duration, said output of said receiver being measured during each of said time intervals.

7. Apparatus of claim 6 further comprising a molten metal level data display unit for symbolic and digital display of data on the molten metal level in said converter; an input of said molten metal level data display unit coupled to said processor means.

8. Apparatus of claim 7 wherein said means for determining further comprises a processor for data processing in a preset sequence; a first input, a second input, a third input, a fourth input, a first output, and a second output of said processor; said first input of said processor, connected to said output of said pulse amplitude analyzer; said second input of said processor connected to said output of said timer; said first output of said processor connected to said input of said molten metal level data display unit; and said second output of said processor connected to said input of said timer, said first sensor being coupled to said third input of said processor; and said second sensor being coupled to said fourth input of said processor.

9. Apparatus of claim 2 wherein the level of molten metal H is $$H = C - \sqrt{\frac{b_1}{I - a_1}}.$$

10. A device for monitoring the level of molten metal in a converter having a nose with an oxygen blowing lance, comprising:
- a $\gamma$-radiation source directing a $\gamma$-radiation flux onto the surface of said molten metal, said source being disposed above said nose of said converter;
- a $\gamma$-radiation receiver to receive pulses of $\gamma$-radiation scattered by the surface of said molten metal, said receiver being disposed above said nose of said converter;
- an amplifier designed for amplifying and shaping of signals sent from said $\gamma$-radiation receiver; an input and an output of said amplifier; said input of said amplifier connected to said $\gamma$-radiation receiver;
- a pulse amplitude analyzer intended for shaping pulses with a given amplitude at its output; an input and an output of said pulse amplitude analyzer; said input of said pulse amplitude analyzer connected to said output of said amplifier;
- a timer intended for setting a desired time interval; an input and an output of said timer;
- a molten metal level data display unit for symbolic and digital display of data on the molten metal level in said converter; an input of said molten metal level data display unit;
- a processor for data processing in a preset sequence; a first input, a second input, a third input, a fourth input, a first output, and a second output of said processor; said first input of said processor, connected to said output of said pulse amplitude analyzer; said second input of said processor, connected to said output of said timer; said first output of said processor, connected to said input of said molten metal level data display unit; and said second output of said processor, connected to said input of said timer;
- a converter position transducer sending a signal of a given position of said converter to said third input of said processor; said converter position transducer connected to said third input of said processor; and
- an oxygen lance position transducer sending a signal to said fourth input of said processor, said signal carrying information on a preset position of said lance and on the beginning of blowing oxygen into said lance; said oxygen lance position transducer connected to said fourth input of said processor.

* * * * *